United States Patent [19]

Bergmann et al.

[11] Patent Number: 5,271,726

[45] Date of Patent: Dec. 21, 1993

[54] APPARATUS FOR EXPLOSIVE SHOCKING OF MATERIALS

[75] Inventors: Oswald R. Bergmann, Wilmington, Del.; Walter J. Simmons, Martinsburg, W. Va.

[73] Assignee: E. I. Du Pont de Nemours and Company, Wilmington, Del.

[21] Appl. No.: 887,792

[22] Filed: May 26, 1992

[51] Int. Cl.$^5$ ............................................. B22F 3/08
[52] U.S. Cl. ............................................. 425/1; 241/301; 264/84
[58] Field of Search .............. 425/1, 77, 78; 264/84; 241/1, 301

[56] References Cited

U.S. PATENT DOCUMENTS

| | | | |
|---|---|---|---|
| 3,022,544 | 2/1962 | Coursen et al. | 425/1 |
| 3,084,398 | 4/1963 | Swed | 425/1 |
| 3,178,807 | 4/1965 | Bergmann | 264/84 |
| 3,220,103 | 11/1965 | Simons | 425/1 |
| 3,367,766 | 2/1968 | Barrington et al. | 264/23 |
| 3,401,019 | 9/1968 | Cowan et al. | 423/446 |
| 3,499,732 | 3/1970 | Garrett | 425/1 |
| 3,568,248 | 3/1971 | Cowan | 425/1 |
| 3,608,014 | 9/1971 | Balchan et al. | 264/84 |
| 3,658,268 | 4/1972 | Martin, III | 241/301 |
| 3,667,911 | 6/1972 | Balchan et al. | 425/77 |

FOREIGN PATENT DOCUMENTS 847775  9/1960  United Kingdom ................ 264/84

*Primary Examiner*—Jay H. Woo
*Assistant Examiner*—Robert B. Davis
*Attorney, Agent, or Firm*—Charles E. Krukiel

[57] ABSTRACT

Apparatus for shock-induced phase transformations in materials where two opposing shock waves pass coaxially through the material to be shocked from either end of its axial dimension on a converging path to a point where the shock waves collide.

3 Claims, 4 Drawing Sheets

APPARATUS FOR EXPLOSIVE SHOCKING OF MATERIALS

BACKGROUND OF THE INVENTION

The present invention relates to an improved apparatus and method for treating materials with shock waves, and, more particularly, to a more efficient apparatus and method for achieving shock-induced phase transformations in materials according to which two opposing shock waves generated by a substantially simultaneous detonation of explosive pass coaxially through the material to be shocked from either end of its axial dimension on a converging path to a point of collision. Using a shocking tube and, optionally a driver tube, with an explosive charge detonated according to the invention, it is possible to substantially increase yield per shot, e.g., up to 50% or more, and eliminate the need for elaborate end-plugs.

Current methods for explosively shocking materials employ a shocking tube for containing the material to be shocked. The explosive charge surrounds the shocking tube and typically extends for the length of material to be shocked. Alternatively, the explosive surrounds a driver tube which is placed coaxially around the shocking tube at a predetermined stand-off distance. In either arrangement, the explosive is typically initiated substantially simultaneously at all points in one transverse plane, usually coincident with one end of the length of material to be shocked. Shocking is accomplished as the shock wave generated by detonation of the explosive passes through the material. Shocking tubes of the type currently used require generally elaborate end-plug closures for containing the material during detonation of the explosive which can substantially reduce the volume available for holding the material. Such end-plugs are not only required to retain the sample within the shocking tube, but they are also required to carry off the momentum associated with a high pressure shock wave with a minimum of reflected waves.

SUMMARY OF THE INVENTION

The present invention is an improved apparatus and method for treating materials, especially powders, with shock waves. The apparatus comprises:
(a) a shocking tube closed at both ends for containing a material to be shocked;
(b) an explosive surrounding the shocking tube and extending at least the length of the material to be shocked;
(c) means for detonating the explosive substantially simultaneously at all points in two transverse planes at either end of the axial dimension of the explosive thereby generating two opposing shock waves which pass coaxially along the shocking tube and through said material on a converging path to a point of collision at the material's midpoint; and
(d) means for restraining the shocking tube about its circumference, e.g., as with a strap of suitable width and thickness positioned about the external tube surface, in the region where the shock waves converge.

In an alternate embodiment the apparatus comprises:
(a) an elongated shocking tube for containing material to be shocked having closed ends for retaining the shocked material within the shocking tube;
(b) restraining means positioned about the midpoint of the shocking tube for restraining the shocking tube against expansion during the shocking procedure;
(c) a first explosive surrounding the shocking tube and extending along its length from one end to the nearest edge of the restraining means;
(d) a second explosive surrounding the shocking tube and extending from its other end along its length to the other edge of the restraining means;
(e) means for detonating the explosives substantially simultaneously at all points in a transverse plane at each end of the shocking tube thereby generating two opposing shock waves for passing coaxially along the shocking tube and through the material to be shocked on a converging path to a point of collision at the shocking tube's midpoint; and
(f) dampening means coaxial with said restraining means for dampening the converging shock waves as they collide.

Either of the foregoing configurations of the apparatus may also include a driver tube which surrounds the shocking tube and is arranged coaxial therewith at a predetermined standoff distance. In such cases, the explosive and restraining/dampening means are positioned about the driver tube in the same manner as they would have been positioned about the shocking tube.

In a another embodiment the apparatus comprises:
(a) a shocking tube for containing material to be shocked, including end closures for retaining the shocked material within the shocking tube;
(b) a driver tube surrounding said shocking tube and arranged coaxial therewith at a specified standoff distance between facing tube surfaces;
(c) an explosive surrounding the driver tube and extending at least the length of the material to be shocked;
(d) means for detonating the explosive substantially simultaneously at all points in two transverse planes, one at either end of the axial dimension of the material to be shocked, thereby generating two opposed shock waves for passing coaxially along said driver tube on a converging path to a point of collision at the driver tube's midpoint; and
(e) restraining means surrounding the driver tube in the region where the opposed shock waves collide.

The improved method of the invention comprises subjecting a material to be shocked, usually a powder held in a closed, somewhat elongated container, e.g., a cylindrical shocking tube, to substantially uniform shock pressures which comprises detonating an explosive or explosively propelling a driver in a manner whereby two pressure pulses are generated at either end of the axial dimension of the material to be shocked and pass coaxially along said material on a converging path to a point of collision at the material's midpoint.

The method and apparatus of the invention are particularly suited for synthesizing diamond from non-diamond carbon. Detonating an explosive charge according to the invention substantially improves the efficiency for treating materials with shock waves because a larger useful volume is available for a given overall size shocking container and explosive charge, and the need for an elaborate end-plug closure is eliminated.

DETAILED DESCRIPTION OF THE INVENTION

Figure 1:
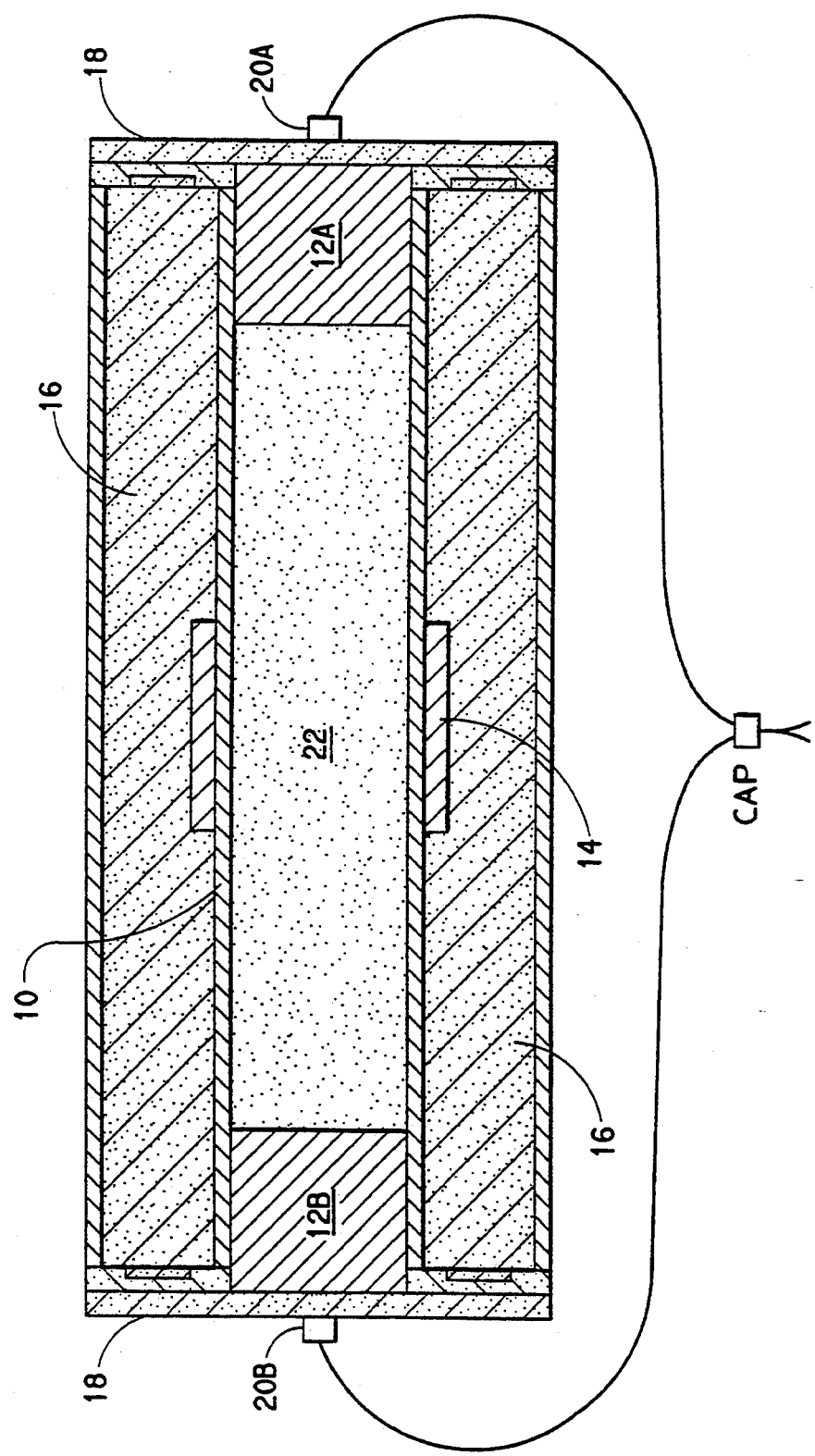
FIG. 1 is a cross-sectional view of an improved shocking tube according to the invention, including restraining means.

The present invention is an improved apparatus and method for treating materials, usually finely divided powders, with shock waves which provides for a larger useful volume for a given overall size shocking container than heretofore obtainable, which, in turn, results in a higher product yield per shot for a given quantity of explosive. Referring now to FIG. 1, which is a cross-sectional view of the apparatus in its simplest form, the apparatus comprises a shocking tube 10, which is a generally elongated container for holding the material to be shocked, with end closures 12A and 12B positioned and held within either end for retaining the material within the shocking tube during the shocking procedure. A plug-type of closure of the type used in practicing the invention is well known, as shown, for example, in U.S. Pat. No. 3,568,248, the teachings of which are incorporated herein by reference. The type of end closure employed, e.g., a plug, a cap or a blind flange, and its means of attachment, e.g., threads, weld or by bolts, are not critical so long as the closure can contain the material within the shocking tube.

Shocking tube 10 is equipped with a restraining means 14 positioned circumferentially about its mid-section for preventing the shocking tube from expanding outwardly, i.e., exploding, as the opposed shock waves move coaxially along shocking tube 10 to a point of collision in the region of the shocking tube's mid-section. The restraining means can be a strap or a sleeve, as shown, or it can comprise a series of windings with a braided metal cable, for example. Any material having a high tensile strength, e.g., carbon steel, stainless steel, brass, aramid fiber, and the like, can be used for the restraining device.

A self-supporting explosive layer 16 of generally uniform thickness surrounds shocking tube 10 and extends for its entire length in contact with the tube surface as shown, but at least the length of the material to be shocked. In order to achieve pressure uniformity along the wall of shocking tube 10, explosive layer 16 is initiated substantially simultaneously at all points in two transverse planes at either end of its axial dimension, i.e., with practically circular symmetry about its axis. Initiation can be accomplished with a disc 18 of detonating explosive which abuts each end of the cylinder formed by shocking tube 10 and explosive layer 16 as shown. Each explosive disc 18 is detonated at its center by accuating non-electric blasting caps 20A and 20B simultaneously. Two opposed shock waves are generated which pass coaxially along the length of shocking tube 10 to a point where the shock waves collide, i.e., in the region of the shocking tube's mid-section. Two detonation fronts form a ring at either end of the shocking tube, and their substantially simultaneous movement toward each other defines a cylinder which is coaxial with the shocking tube. The material to be shocked, generally in powder form, occupies the cylindrical cavity 22 between end closures 12A and 12B.

The invention lies in the discovery that two opposing shock wave fronts can be generated substantially simultaneously which will pass over the desired boundary of a shocking tube, or shocking tube/driver tube assembly, and collide at the tube's midpoint and thereby dissipate or balance their respective energies to the extent that the shocked material can be retained within the shocking tube without the need for elaborate end closures. Less elaborate, or less intrusive end closures translates to more available volume within the shocking tube for holding the material to be shocked without having to change the amount of explosive, and yield per shot can be increased up to about 50%.

Figure 2:
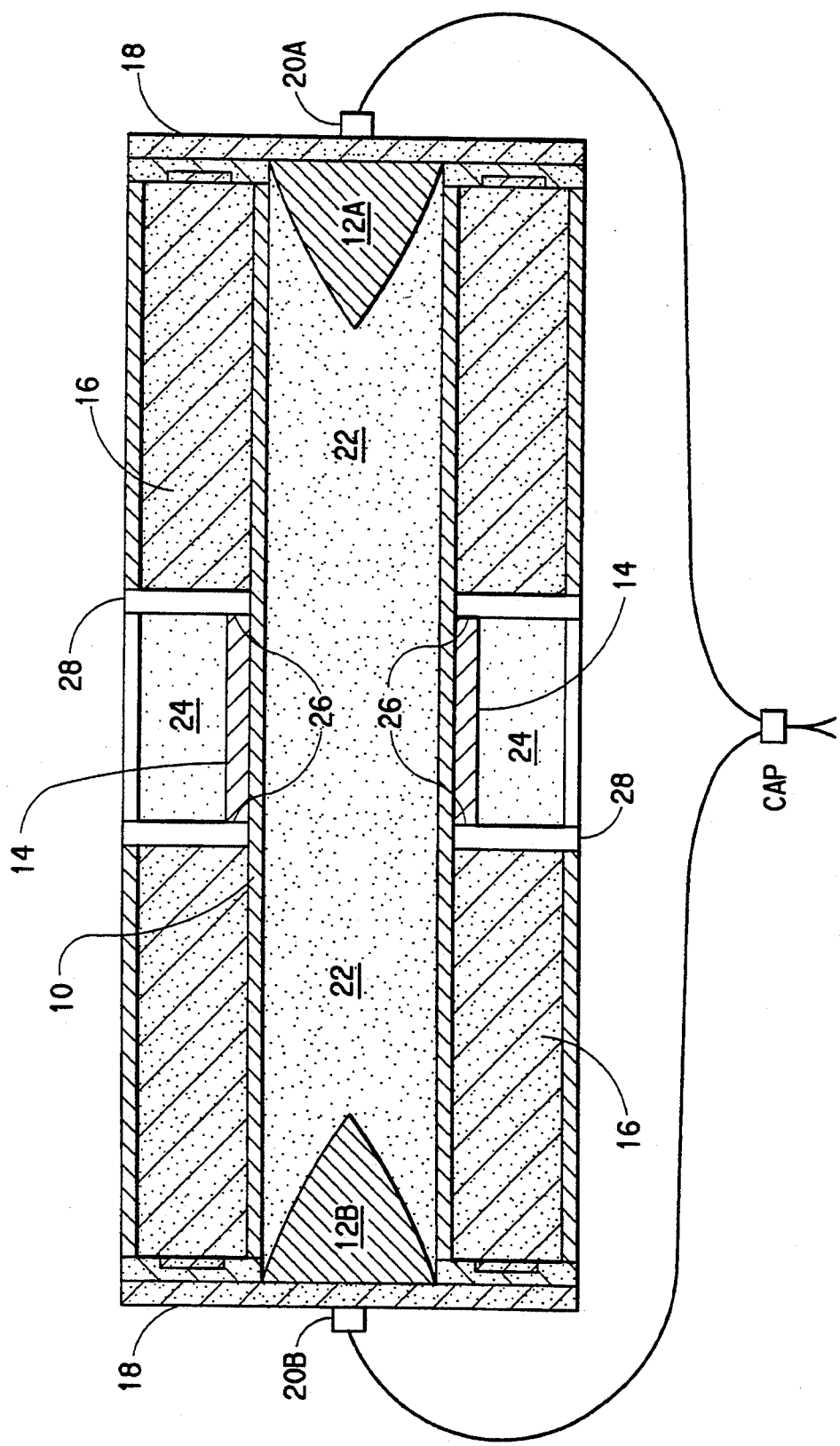
FIG. 2 is a cross-sectional view of an improved shocking tube according to the invention with restraining means and a means for dampening converging shock waves.

An alternate embodiment of the invention is shown in FIG. 2 which includes a dampening means 24 coaxial with restraining means 14. According to this embodiment, two self-supporting explosive layers 16 are used which extend from their respective ends of shocking tube 10 to the closest edge 26 of restraining means 14. According to this example, an inert partition 28 is employed, as shown, which separates the explosive layers 16 from dampening means 24. Ordinarily, dampening is provided by a shock-absorbing material, such as, for example, sand or air.

Figure 3:
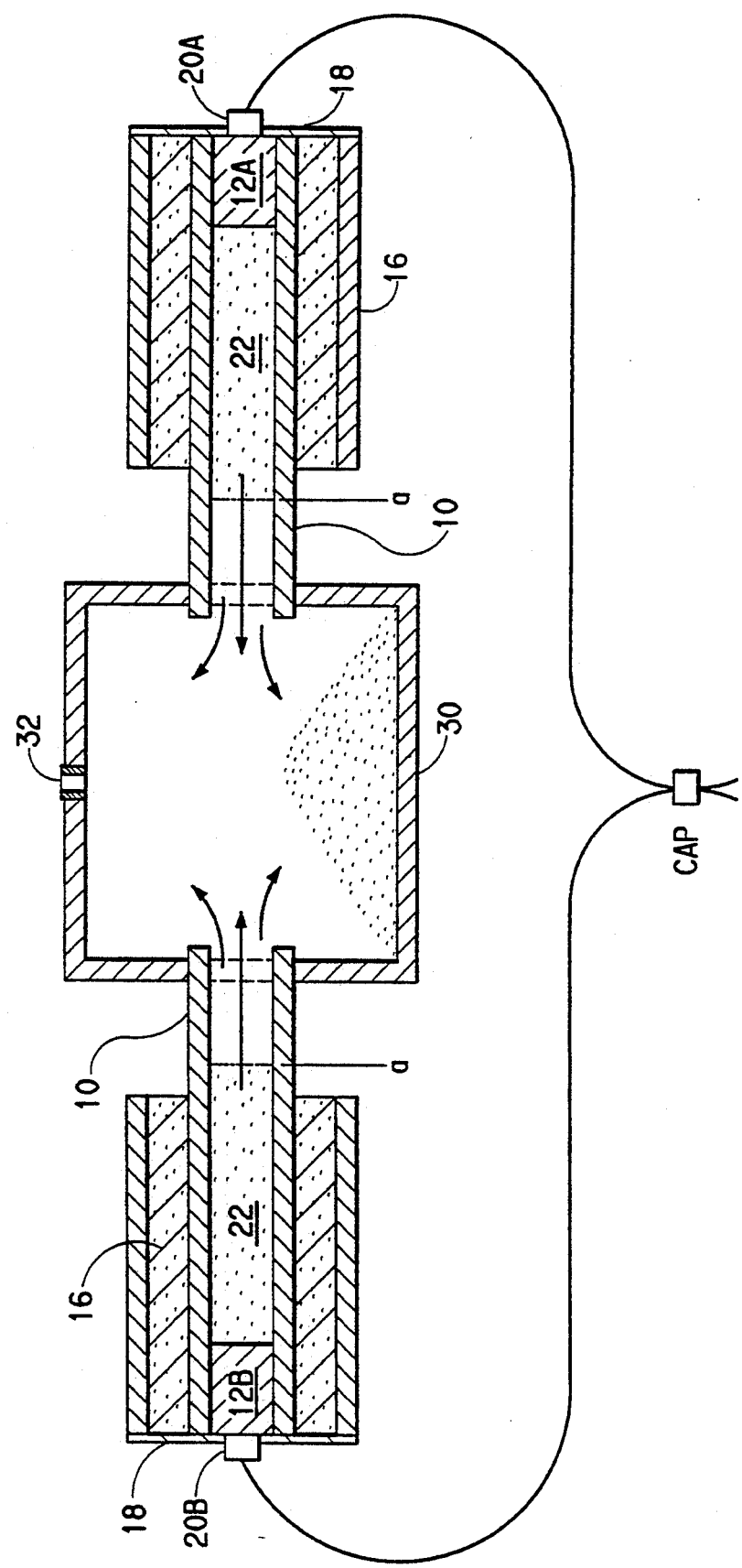
FIG. 3 is a cross-sectional view of an embodiment of the apparatus according to the invention in which two opposed shocking tubes are separated by an enlarged collection chamber.

Referring now to FIG. 3, two substantially identical shocking tubes 10 are positioned in an opposed coaxial relationship with respect to each other and are joined to collection chamber 30 forming a unified closed container. Shocking tubes 10 are integral with collection chamber 30 with their respective ends which communicate with the collection chamber being open. Their respective ends which are farthest from the collection chamber are closed. Substantially identical masses of powder to be shocked are placed within each shocking tube 10 in the cylindrical space extending from their closed end to a transverse boundary a. Explosive layers 16 are arranged to extend at least along the entire length of material to be shocked, and they are initiated substantially simultaneously at all points in two transverse planes generally equi-distant from the mid-point of the collection chamber thereby generating two opposed shock wave fronts which pass coaxially along the length of their respective shocking tubes to a point of collision generally at the mid-point of collection chamber 30. Collection chamber 30 can be provided with several small holes (e.g., about 0.5-10 mm diameter) or secondary openings 32 which relieve the pressure generated within the apparatus during the shocking process. When a collection chamber is employed, there is no need for a restraining device or dampening means, i.e., the collection chamber configuration is a contemplated equivalent of the shocking tube configuration which includes a restraining means and/or a dampening means. The collection chamber can have any desired shape, e.g., cylindrical, spherical, box-like, etc. For economy and ease of handling, a cylindrical collection chamber is preferred.

Figure 4:
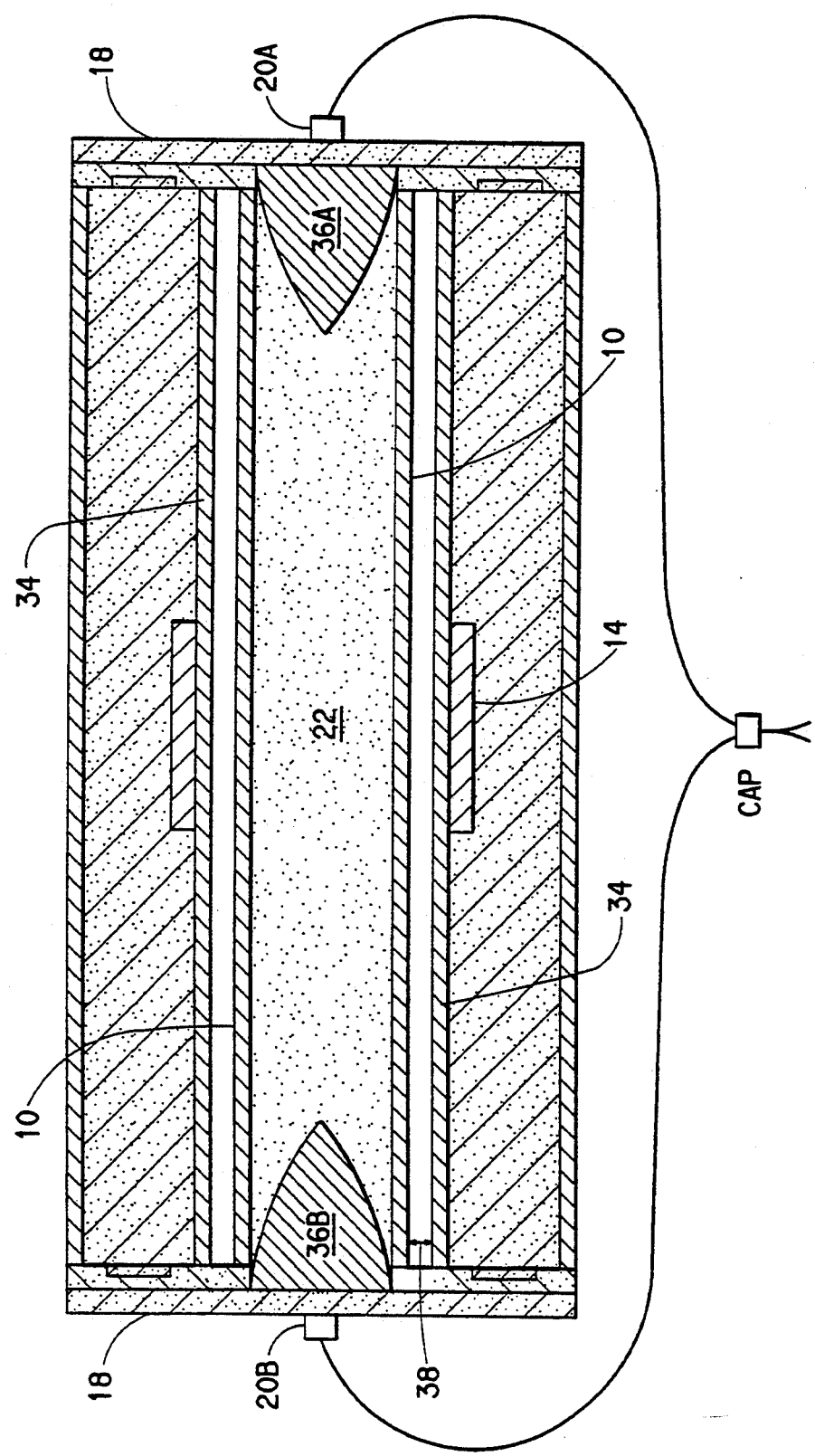
FIG. 4 is a cross-sectional view of an improved shocking tube assembly according to the invention which includes a driver tube and a restraining/dampening means.

FIG. 4 depicts a configuration of the apparatus shown in FIG. 1, which also includes a driver tube 34 coaxial with shocking tube 10. The outermost end of each shocking tube 10 is closed with tapered end-plugs 36A and 36B which are secured in place by a continuous weld. Driver tube 34 (tubular projectile) and the shocking tube are substantially coaxial, and their facing surfaces are substantially parallel to each other, i.e., at an angle of not more than about 5 deg. to each other. The standoff distance 38 between facing tube surfaces can vary, but should be sufficiently large to permit the projectile, i.e., driver, tube to achieve a velocity upon impact with the shocking tube sufficient to produce the desired pressure within the mass of material to be shocked.

The materials of construction and wall thicknesses of the components of the apparatus can vary widely, depending, for example, on the magnitude of the pressure to which the component is subjected. To assure good powder containment, the shocking tube, collection chamber and closure members are made of mild steel, and the wall thickness of the shocking tube and the collection chamber can be the same or different.

Where opposed shocking tubes are separated by a collection chamber, as shown, for example, in FIG. 3, and the two masses of material to be shocked cannot be maintained in their required position by gravity alone, one or both ends of the material can be maintained at boundary a by a thin membrane-like layer, e.g., styrofoam or cardboard. which is capable of supporting the material, but is also subject to being ruptured easily by the shock wave. Preferred for its reduced risk of contamination is a membrane-like layer comprising a pressed or sintered disc of powder having the same composition as the material to be shocked.

While the apparatus of the present invention finds its greatest utility in the shocking of dry, particulate solids of small particle size, it will be obvious to one reasonably skilled in the art that the apparatus could also be used to apply shocking forces to other materials for which it is desired to have an unrestrained material boundary during shocking.

The following examples serve to illustrate specific embodiments of the apparatus of this invention.

EXAMPLE 1

The method and apparatus of the invention was used to shock treat cordierite powder. Cordierite is a magnesium aluminum silicate composition of molecular formula $Mg_2Al_4Si_5O_{18}$. An apparatus similar in configuration to that shown in FIG. 3 was used, and 75 grams of cordierite powder were press-packed into the outermost end of each of the symmetrically opposed carbon steel shocking tubes. Total cordierite powder weight was 150 grams. The steel tubes each had an outside diameter of 1.75 inch (4.45 cm), a wall thickness of 0.125 inch (3.2 mm), and a length of 10 inches (25.4 cm). A solid mild steel plug, 13/16 inch long (2.06 cm) and of a tapered configuration as shown in FIG. 4 was secured within the end of each shocking tube with a continuous weld. After the cordierite powder portions were packed into each tube against the end plugs, the open end of each tube was positioned so as to communicate with a collection chamber via a threaded fitting in an opposed coaxial relationship with respect to each other. The collection chamber comprised a mild steel tube having an inside diameter of 4.0 inches (10.2 cm), a wall thickness of 0.125 inch (3.2 mm), and a length of 6.0 inches (15.25 cm). Each mild steel shocking tube was wrapped with a 0.125 inch (3.2 mm) layer of a cloth tape, such as duct tape, and then wrapped with a 0.125 inch (3.2 mm) layer of "Datasheet" C brand flexible explosive. "Datasheet" C is a flexible sheet explosive available commercially from E. I. du Pont de Nemours and Company, Wilmington, Del. "Datasheet" C contains 63% by weight pantaerythritol tetranitrate and 8% by weight nitrocellulose in a "Citroflex" binder (acety tributyl citrate), has a density of 1.5 grams/cubic centimeter, and detonates at a rate of 7000 meters per second.

The initiation end, i.e., the outermost end, of each shocking tube was covered with a 0.125 thick (3.2 mm) disk of "Datasheet" C explosive. Equal lengths of commercially available detonating cord were connected to each outermost end of the shocking tubes, and the opposite ends of the two detonating cords were joined and attached to a commercial detonator. The assembly was placed on the ground in a "shooting pit" at ambient temperature and pressure, and then the explosive was detonated by activating the commercial detonator.

Following the shot, the assembly was recovered intact, and all of the original cordierite powder was contained within the apparatus. The two steel shocking tubes were observed to have been significantly reduced in diameter, but not fracturing was observed. Reduction of shocking tube diameter which resulted from the shocking procedure indicated that the shocking procedure has been effective in subjecting the original mass of cordierite powder to transient high pressure from the detonating explosive. The apparatus was disassembled and the shocked cordierite powder was recovered partly from the collection chamber and partly from the shocking tubes.

Shocked cordierite powder of the type produced according to the example is useful in preparing sintered dielectric ceramic capacitor bodies.

EXAMPLE 2

The process of the invention was used to shock-treat an aluminum oxide powder (99.5% $Al_2O_3$) having a particle size of less that 325 mesh. An apparatus substantially the same as described in Example 1 was assembled, except that (1) the driver tube was positioned around each shocking tube as shown in FIG. 4; (2) a higher explosive load was used ("Datasheet" C having a thickness of 0.025 inch [6.35 mm]); and (3) 2.5 inch long (6.35 cm) steel plugs were used to seal the outermost end of each shocking tube. A total of 380 grams of $Al_2O_3$ powder was used for the experiment, 190 grams being press packed into the outermost end of each shocking tube. After the shot, the container was found intact, and all of the powder sample was within the container. A total of 344 grams of shocked $Al_2O_3$ powder was recovered, partly from the collection chamber and partly from the shocking tubes. The shock treatment of $Al_2O_3$ powder improves its sintering properties and usefulness in preparing high temperature ceramics parts.

EXAMPLE 3

An apparatus similar to that shown in FIG. 2 which also included a driver tube was assembled to demonstrate the invention. A radial expansion restraint comprising three layers of 0.250 inch (6.35 mm) stainless steel wire wrapped about the midsection of the assemble for a length of 4 inches (10.2 cm) was used. The apparatus comprised a single elongated shocking tube closed at each end with a 3 inch long (7.62 cm) solid tapered steel plug. The shocking tube was 4 ft. long (121.9 cm), 2.5 inches (6.35 cm) outside diameter, and had a wall thickness of 0.125 inch (3.2 mm). It was press-packed with 34 lbs 4 oz. (15.53 kg) of −100 mesh copper powder. A mild steel driver tube having an outside diameter of 3.5 inches (8.89 cm), a wall thickness of 0.250 inch (6.35 mm) was positioned coaxially with respect to the shocking tube to provide a standoff distance of 0.24 inch (6.1 mm). The radial expansion restraint was wrapped around the driver tube, and each of the three layers of wire was taped. The explosive was held in place at each end of the shocking tube for the length of material to be shocked by a 0.25 inch thick (6.35 mm) cardboard tube. The explosive composition comprised powdered ammonium nitrate, fuel oil, and an inert diluent, and it had a detonation velocity of 4500 meters/second. The depth of the explosive which was substantially uniform between the outer surface of the driver tube and the inside surface of the cardboard tube was 1.75 inch (44.5 mm). The total weight of explosive was 43.75 lbs. (19.84 kg). The explosive was detonated at ambient temperature and pressure.

After the shot, the apparatus was found intact, and all the copper powder was contained within the shocking tube. The shocking procedure according to this example simulated the mechanical conditions most desired for explosive shock synthesis of diamond. The apparatus was judged suitable for synthesizing diamond for non-diamond carbon, and would have produced synthetic diamond had such carbon been substituted for a portion of the original copper powder prior to detonation of the explosive. The general method for preparing synthetic diamond from non-diamond carbon is described in U.S. Pat. Nos. 3,401,019 and 3,667,911, the disclosures of which are incorporated herein by reference.

We claim:

1. An apparatus for treating materials with shock waves which comprises:
   (a) a shocking tube closable at both ends for containing a material to be shocked;
   (b) an explosive surrounding the shocking tube and extending at least the length of the material to be shocked;
   (c) means for detonating the explosive substantially simultaneously at all points in two transverse planes, one at each end of the axial dimension of the explosive, thereby simultaneously generating two opposing shock waves which pass coaxially along the shocking tube and through said material on a converging path to a locus of collision; and
   (d) means for restraining the shocking tube in the region where the shock waves collide.

2. An apparatus for treating materials with shock waves which comprises:
   (a) an elongated shocking tube for containing materials to be shocked having closed ends for retaining the shocked material within the shocking tube;
   (b) restraining means located at the midpoint of the shocking tube and arranged about its circumference for restraining the shocking tube from expanding outwardly during the shocking procedure;
   (c) a first explosive surrounding the shocking tube to a generally uniform depth and extending along its length from one end to the nearest edge of the restraining means;
   (d) a second explosive surrounding the shocking tube to a generally uniform depth and extending along its length from the other end to the other edge of the restraining means;
   (e) means for detonating the explosive substantially simultaneously at all points in a transverse plane at each end of the shocking tube thereby generating two opposing shock waves which pass coaxially along the shocking tube and through the material to be shocked on a converging path to a locus of collision at the shocking tube's midpoint; and
   (f) means for dampening the converging shock waves as they collide which is coaxial with said restraining means.

3. An apparatus for treating finely divided material with shock waves which comprises:
   (a) a shocking tube for containing material to be shocked, including end closures for retaining the shocked material within the shocking tube during the shocking procedure;
   (b) a driver tube surrounding said shocking tube and arranged coaxial therewith at a generally uniform standoff distance between facing tube surfaces;
   (c) an explosive surrounding the driver tube to a generally uniform depth and extending along the surface of the driver tube at least the length of the material to be shocked;
   (d) means for detonating the explosive substantially simultaneously at all points in two transverse planes, one at each end of the axial dimension of the material to be shocked, thereby to generate two opposed detonation wavefronts to pass coaxially along said driver tube on a converging path to a point of collision at the driver tube's midpoint; and
   (e) restraining means arranged to surround the driver tube in the region where the wavefronts collide to restrain the driver tube from expanding outwardly.

* * * * *